Figure 1:
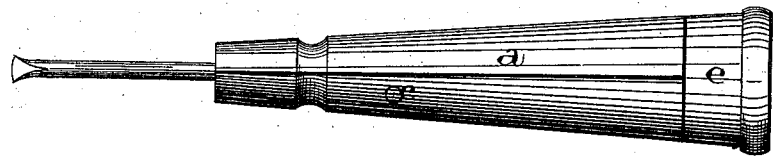
Figure 2:
Figure 3:
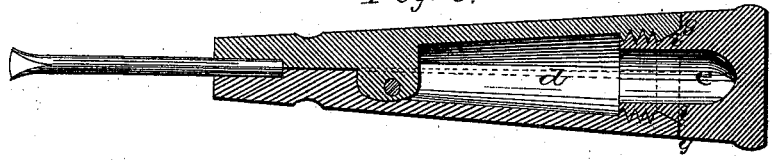

C. F. PACKARD.
TOOL-HOLDER.

No. 174,287. Patented Feb. 29, 1876.

WITNESSES.

INVENTOR.

UNITED STATES PATENT OFFICE.

CHARLES F. PACKARD, OF NEW BRITAIN, CONNECTICUT.

IMPROVEMENT IN TOOL-HOLDERS.

Specification forming part of Letters Patent No. 174,287, dated February 29, 1876; application filed January 27, 1876.

*To all whom it may concern:*

Be it known that I, CHARLES F. PACKARD, of New Britain, in the county of Hartford and State of Connecticut, have invented certain new and useful Improvements in Tool-holders; and I do hereby declare the following to be a full, clear, and exact description of the invention, such as will enable others skilled in the art to which it pertains to make and use it, reference being had to the accompanying drawings, which form part of this specification.

My invention relates to an improvement in tool-holders; and it consists in making the handle in two parts and pivoting them together in such a manner as to allow a slight movement at each end, for the purpose of opening and closing them, as will be more fully described hereinafter.

The accompanying drawings represent my invention.

$a$ represents the handle, made in two parts, and pivoted together at the point $c$. The upper end of the handle is hollow, and adapted to receive the various tools to be used, while in the smaller lower end is formed the socket or clamp, for holding any one of them while being used. The edges of one or both halves, and at one or both ends, are slightly beveled away so as to allow a slight rocking motion upon each other from end to end. The tool-chamber $d$ is closed by the screw-plug $e$, upon which, between the screw-thread and shoulder $g$, is formed the incline or cone $i$, which entering between the ends of the two halves, forces them apart and the lower ends tightly together. By placing the tool between the lower ends, and then screwing in the cap, the tool is clamped rigidly in position. By this arrangement and combination of parts, the very act of taking off or putting on the cap loosens or tightens the tool in position.

I claim—

A tool-handle for holding and carrying tools, which consists of a divided shell, the parts of which are pivoted together so as to have a slight rocking motion upon each other, and which are made to clamp the tool by means of the cap, substantially as shown and described.

In testimony that I claim the foregoing, I have hereunto set my hand this 19th day of January, 1876.

CHARLES FOSTER PACKARD.

Witnesses:
HENRY RICHARDS,
JUSTUS A. TRAUT.